United States Patent
Shimomura et al.

(10) Patent No.: US 8,960,246 B2
(45) Date of Patent: Feb. 24, 2015

(54) PNEUMATIC TIRE

(75) Inventors: Kazuo Shimomura, Osaka (JP); Toshiyuki Ohashi, Osaka (JP)

(73) Assignee: Toyo Tire & Rubber Co., Ltd., Osaka-shi (JP)

(*) Notice: Subject to any disclaimer, the term of this patent is extended or adjusted under 35 U.S.C. 154(b) by 695 days.

(21) Appl. No.: 13/212,698

(22) Filed: Aug. 18, 2011

(65) Prior Publication Data

US 2012/0090748 A1    Apr. 19, 2012

(30) Foreign Application Priority Data

Oct. 18, 2010    (JP) .................................. 2010-233669

(51) Int. Cl.
*B60C 11/11*   (2006.01)
*B60C 11/117*  (2006.01)
*B60C 11/24*   (2006.01)
*B60C 11/03*   (2006.01)
*B60C 11/13*   (2006.01)

(52) U.S. Cl.
CPC ............. *B60C 11/0306* (2013.01); *B60C 11/13* (2013.01); *B60C 11/24* (2013.01); *B60C 2011/133* (2013.01)
USPC ............... 152/209.16; 152/209.17; 152/154.2

(58) Field of Classification Search
CPC .... B60C 11/0306; B60C 11/13; B60C 11/24; B60C 2011/133; B60C 11/032; B60C 11/0323; B60C 11/1307; B60C 11/0309
USPC .............................. 152/209.16, 209.17, 154.2
See application file for complete search history.

(56) References Cited

U.S. PATENT DOCUMENTS

| | | | |
|---|---|---|---|
| 2,706,509 A * | 4/1955 | White ....................... | 152/209.21 |
| 2002/0036039 A1* | 3/2002 | Shimura .................... | 152/154.2 |
| 2008/0047644 A1* | 2/2008 | Yoshikawa et al. ...... | 152/209.27 |
| 2009/0095388 A1* | 4/2009 | Cuny et al. ................ | 152/154.2 |
| 2009/0165910 A1* | 7/2009 | Shimizu .................... | 152/209.18 |
| 2009/0272473 A1* | 11/2009 | Kojima ..................... | 152/209.15 |
| 2010/0193100 A1* | 8/2010 | Ohashi ........................ | 152/523 |
| 2010/0307652 A1* | 12/2010 | Doan et al. ............... | 152/209.25 |

FOREIGN PATENT DOCUMENTS

| | | |
|---|---|---|
| JP | 2004-351991 A | 12/2004 |
| JP | 2009-214824 A | 9/2009 |

OTHER PUBLICATIONS

German Office Action dated Jan. 4, 2012, issued in corresponding German Patent Application No. 102011108988.1.

* cited by examiner

*Primary Examiner* — Eric Hug

(74) *Attorney, Agent, or Firm* — Westerman, Hattori, Daniels & Adrian, LLP

(57) ABSTRACT

A pneumatic tire comprises a plurality of main grooves extending along a tire circumferential direction, and shoulder lateral grooves extending to an outer side in a tire width direction from a shoulder main groove positioned in an outermost side in the tire width direction among the main grooves, the main grooves and the shoulder lateral grooves being arranged on a tread surface, wherein a depression is formed on a wall surface of a land portion facing to the shoulder lateral groove, in a state in which it is not exposed to a surface of the land portion, and wherein the depression is formed in such a manner that a height of the depression in a depth direction of the shoulder lateral groove is reduced toward an inner side in the tire width direction, and an exposure length of the depression becomes longer in accordance with a progress of an abrasion of the land portion.

3 Claims, 4 Drawing Sheets

PNEUMATIC TIRE

BACKGROUND OF THE INVENTION

1. Field of the Invention

The present invention relates to a pneumatic tire which is provided on a tread surface with a plurality of main grooves extending along a tire circumferential direction, and shoulder lateral grooves extending to an outer side in a tire width direction from the shoulder main grooves positioned in an outermost side in the tire width direction among these main grooves.

2. Description of the Related Art

On a tread surface of a general pneumatic tire, there are provided with a plurality of main grooves extending along a tire circumferential direction, and lateral grooves extending so as to intersect the main grooves. In the pneumatic tire mentioned above, there may be generated a so-called biased abrasion, that is, a phenomenon in which a tread surface coming into contact with a road surface wears partly by priority without wearing uniformly.

On the basis of the main groove (which may be called as the shoulder main groove) which is positioned in the outermost side in the tire width direction among a plurality of main grooves, on the assumption that an inner side thereof is a center region, and an outer side thereof is a shoulder region, a shoulder abrasion that the shoulder region wears by priority may be generated, and a biased abrasion in the tire width direction may be generated. As a result of an analysis by the inventors of the present invention, there has been found that a ground contact pressure in the shoulder region is comparatively higher in comparison with the center region, particularly at a time of braking, and an unevenness of the ground contact pressure mentioned above causes the shoulder abrasion.

The following Japanese Unexamined Patent Publication No. 2004-351991 discloses a pneumatic tire which is provided with a projection in a side wall having a greater deformation, in two side walls of a lateral groove, and can suppress a deformation of the side wall by bringing the projection into contact with the opposed side wall even if the side walls deform. However, the pneumatic tire in accordance with the Japanese Unexamined Patent Publication No. 2004-351991 aims at suppressing a heel and toe abrasion, and does not aim at suppressing a shoulder abrasion caused by the unevenness of the ground contact pressure mentioned above.

Further, in the pneumatic tire, since a groove volumetric capacity is reduced by a progress of he abrasion, a drainage performance is lowered in conjunction with the progress of the abrasion. In the pneumatic tire described in the Japanese Unexamined Patent Publication No. 2004-351991, since the projection reduces the groove volumetric capacity of the lateral groove, the drainage performance tends to be further deteriorated.

SUMMARY OF THE INVENTION

Problem to be Solved by the Invention

The present invention is made by taking the actual condition mentioned above into consideration, and an object of the present invention is to provide a pneumatic tire which can maintain a drainage performance and can suppress a shoulder abrasion caused by an unevenness of a ground contact pressure.

Means for Solving the Problem

To achieve the above object, a pneumatic tire in accordance with the present invention comprises:

a plurality of main grooves extending along a tire circumferential direction;

shoulder lateral grooves extending to an outer side in a tire width direction from a shoulder main groove positioned in an outermost side in the tire width direction among the main grooves;

the main grooves and the shoulder lateral grooves being arranged on a tread surface, wherein a depression is formed on a wall surface of a land portion facing to the shoulder lateral groove, in a state in which it is not exposed to a surface of the land portion, and wherein the depression is formed in such a manner that a height of the depression in a depth direction of the shoulder lateral groove is reduced toward an inner side in the tire width direction, and an exposure length of the depression becomes longer in accordance with a progress of an abrasion of the land portion.

In the pneumatic tire in accordance with this structure, it is possible to lower a rigidity of a land portion so as to absorb the ground contact pressure by forming the depression on the wall surface of the land portion facing to the shoulder lateral groove. Accordingly, it is possible to suppress the shoulder abrasion by promoting an evenness of the ground contact pressure. Further, since the ground contact pressure within the shoulder region is reduced toward the inner side in the tire width direction, a rigidity difference in the tire width direction becomes smaller by reducing the height of the depression toward the inner side in the tire width direction in correspondence thereto, whereby it is possible to further uniformize the ground contact pressure, and it is possible to effectively suppress the shoulder abrasion. Further, since the depression is formed on the wall surface of the land portion, it is easy to secure the groove volumetric capacity after the abrasion, and it is possible to suppress a reduction of the drainage performance in the process of wearing. As a result, in accordance with the pneumatic tire of the present invention, it is possible to maintain the drainage performance, and it is possible to suppress the shoulder abrasion caused by the unevenness of the ground contact pressure.

In the pneumatic tire in accordance with the present invention, it is preferable that the height of the depression is reduced in a stepped manner toward the inner side in the tire width direction. In the present invention, since the depression is structured in such a manner that the length of explosion of the depression becomes longer in accordance with a progress of the abrasion in the land portion, it is possible to determine an abrasion state on the basis of the length of explosion. Further, since the length of explosion of the depression is changed step by step in the wearing process, by reducing the height of the depression in a stepped manner toward the tire width direction, the depression can serve as an indicator which can easily determine the abrasion state of the pneumatic tire visually.

In the pneumatic tire in accordance with the present invention, it is preferable that a depth of the depression is increased toward the outer side in the tire width direction. In accordance with this structure, it is possible to more further suppress the shoulder abrasion by accurately uniformizing the ground contact pressure as well as reducing the height of the depression mentioned above toward the inner side in the tire width direction. In addition, it is possible to set an edge portion in the outer side in the tire width direction of the depression exposing to the surface on the basis of the progress of the abrasion longer, and it is possible to enhance an edge effect caused by the depression at a time when the abrasion makes progress so as to improve a snow performance.

DETAILED DESCRIPTION OF THE PREFERRED EMBODIMENTS

Figure 1:
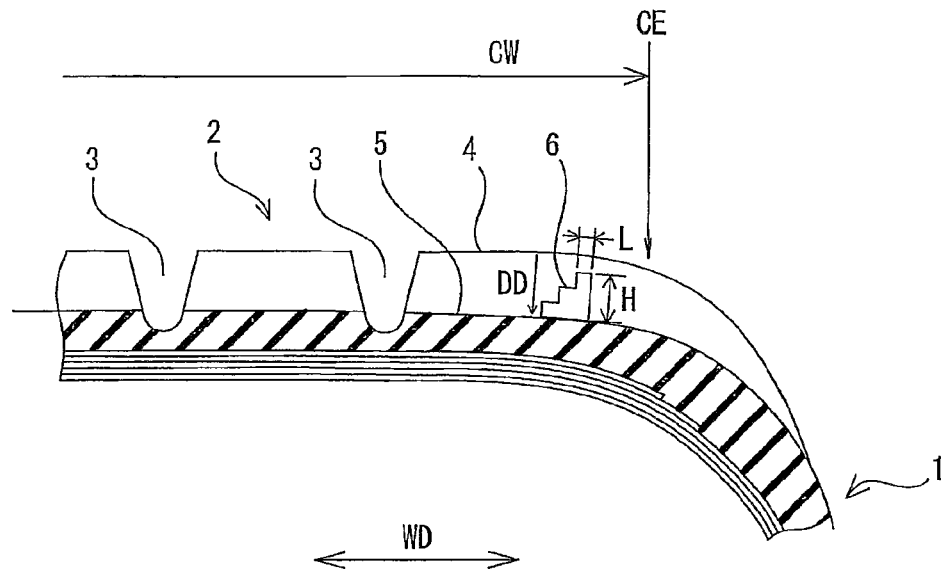
FIG. 1 is a tire meridian cross sectional view showing a substantial part of a pneumatic tire in accordance with the present invention.
Figure 2:
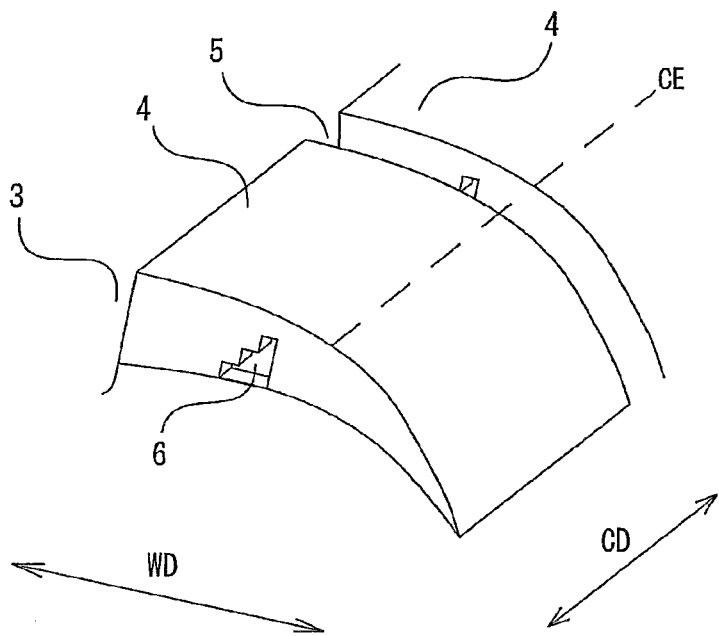
FIG. 2 is a perspective view showing a shoulder land portion.
Figure 3:
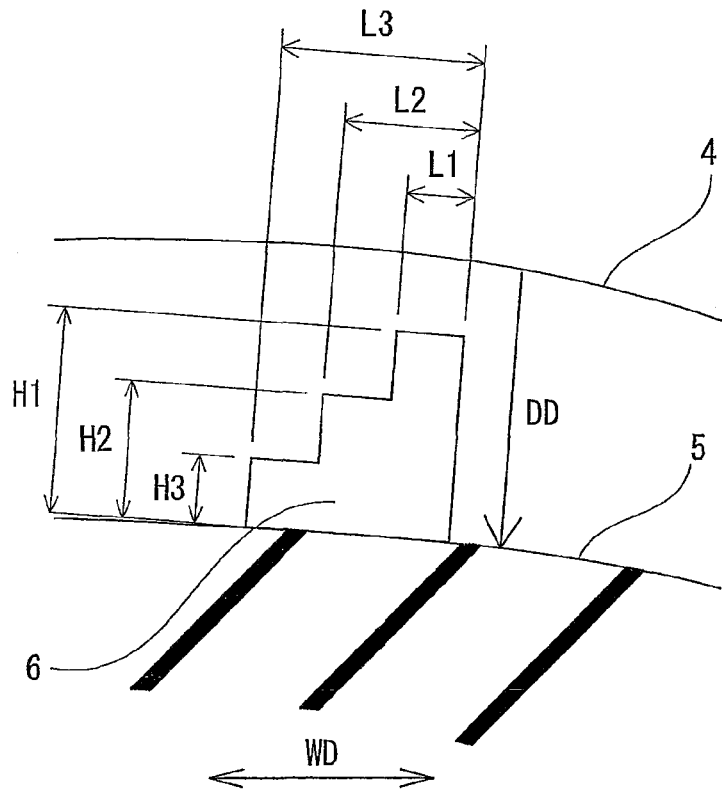
FIG. 3 is a partly enlarged view showing details of a depression in FIG. 1.

A description will be given of an embodiment in accordance with the present invention with reference to the accompanying drawings. FIG. 1 is a tire meridian circle cross sectional view showing a substantial part of a pneumatic tire in accordance with the present invention, and FIG. 2 is a perspective view showing a shoulder land portion. FIG. 3 is a partly enlarged view showing details of a depression in FIG. 1. In this case, they all show an unworn state at a time of a new tire. In FIGS. 1 and 2, reference symbol WD denotes a tire width direction, reference symbol CD denotes a tire circumferential direction, and same applies to the following drawings.

The pneumatic tire shown in FIGS. 1 and 2 is provided with a pair of side wall portions 1 which extend from a pair of bead portions (not shown) to an outer side in a tire radial direction, and a tread portion which is positioned between both the side wall portions 1. On a tread surface 2 of the tread portion, there are formed a plurality of main grooves 3 which extend along the tire circumferential direction CD, and shoulder lateral grooves 5 which extend from the main groove 3 (which is called as the shoulder main groove 3) positioned in an outermost side in the tire width direction WD among these main grooves 3. On the assumption that an inner side in the tire width direction WD is a center region, and an outer side in the tire width direction WD is a shoulder region, on the basis of the shoulder main groove 3, a plurality of shoulder land portions 4 arranged in the tire circumferential direction CD are formed in the shoulder region.

As shown in FIG. 2, in the present embodiment, there is shown an example in which a shoulder block 4 zoned by the shoulder main grooves 3 and the shoulder lateral grooves 5 is formed as the shoulder land portion 4. However, the present invention may be structured such that a shoulder rib in which at least a part closer to the inner side in the tire width direction WD than a ground contact end CE continuously extends in the tire circumferential direction CD is formed as the shoulder land portion 4. In this case, the present invention is particularly effective in the case that the shoulder block 4 is formed as the shoulder land portion 4.

In this case, the ground contact end CE is an outermost position in a tire axial direction at which a tire assembled in a normal rim so as to be filled with a normal internal pressure is grounded on a flat road surface at a time of being vertically put on the flat road surface and being applied a normal load. In this case, the normal load and the normal internal pressure are set to a maximum load (a design normal load in the case of a tire for a passenger car) which is defined in a standard corresponding to a used place and a manufacturing place of the tire, such as JATMA, TRA, ETRTO and the like, and a pneumatic pressure corresponding thereto, and the normal rim is set to a standard rim which is defined in JATMA, TRA, ETRTO and the like as a general rule. A distance between the ground contact ends CE in both sides in the tire width direction WD comes to a ground contact width CW.

A depression 6 is formed on a wall surface of the shoulder block 4 facing to the shoulder lateral groove 5. Although it is not shown in FIG. 2, the depression 6 is formed in each of the wall surfaces of the shoulder blocks 4 in both sides facing to the shoulder lateral groove 5. A height H of the depression 6 in a depth direction DD of the shoulder lateral groove 5 is reduced toward an inner side in the tire width direction WD. In the present embodiment, there is shown an example in which the height H of the depression 6 is reduced in a stepped manner toward the inner side in the tire width direction WD. Specifically, as shown in FIG. 3, the height H of the depression 6 is changed in three stages such as H1, H2 and H3 toward the inner side in the tire width direction WD. In this case, the stage number of the stepped depression 6 is not limited to this. Further, it is preferable that the height H1 of the depression 6 is between 50 and 80% with respect to the depth of the shoulder main groove 3. If it is less than 50%, it is impossible to effectively lower a rigidity of the shoulder block 4. If it goes beyond 80%, the rigidity of the shoulder block 4 becomes inversely too low.

In the present embodiment, the depression 6 is formed in a non-exposed state on the surface of the shoulder block 4 at a time of a new tire, as shown in FIGS. 1 to 3. However, if the height of the shoulder block 4 becomes lower on the basis of the progress of the abrasion, the depression 6 is going to be exposed to the surface of the shoulder block 4 little by little. The depression 6 is formed in such a manner that an exposure length L becomes longer in accordance with the progress of the abrasion of the shoulder block 4. The exposure length L is a length in an extending direction of the shoulder lateral groove 5. In the present embodiment, as shown in FIG. 3, there is shown an example in which the exposure length L is changed such as L1, L2 and L3, in accordance with the progress of the abrasion. For example, by structuring such that the depression 6 is exposed at the exposure length L1 at a time point when 30% of the depth of the shoulder lateral groove 5 wears, and the depression 6 is exposed at the exposure length L2 at a time point when 60% wears, the depression 6 serves as an indicator which can easily determined an abrasion state of the pneumatic tire. Further, it is preferable that the exposure length L3 of the depression 6 is between 100 and 300% of the height H1 of the depression. If it is less than 100%, the rigidity of the shoulder block 4 is locally lowered. If it goes beyond 300%, it is impossible to effectively lower the rigidity of the shoulder block 4.

Figure 4:
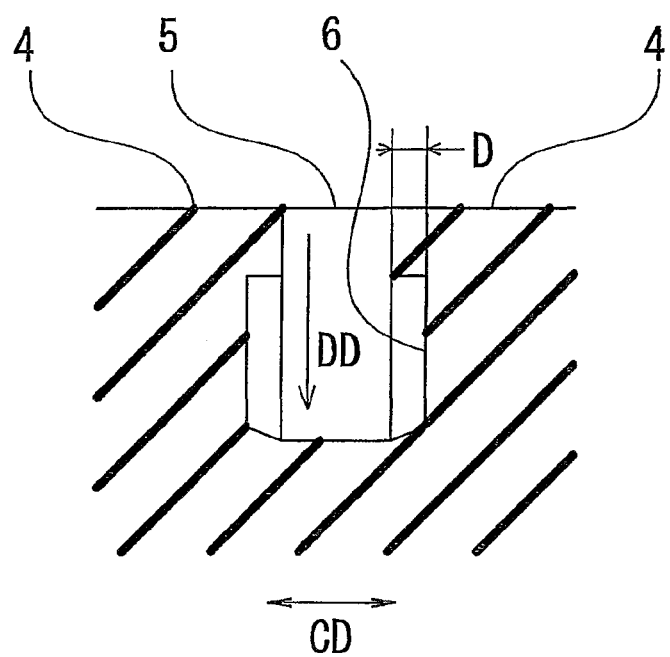
FIG. 4 is a cross sectional view of a shoulder lateral groove at a forming position of the depression.
Figure 5:
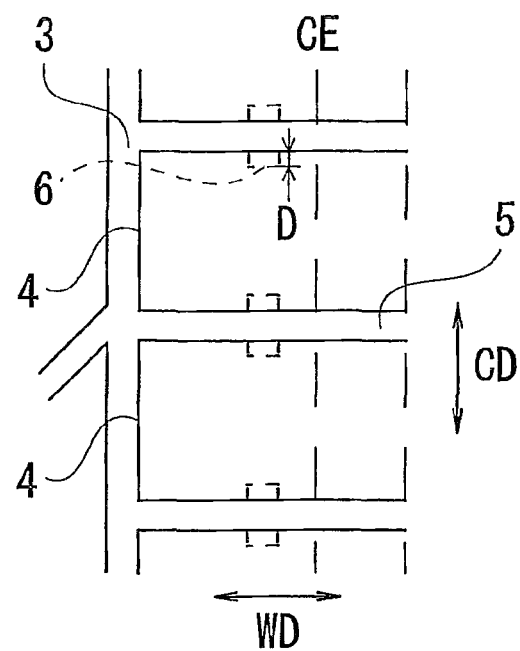
FIG. 5 is a plan view of a shoulder block.

FIG. 4 is a cross sectional view of the shoulder lateral groove 5 at a forming position of the depression 6. FIG. 5 is a plan view of the shoulder block 4. A depth D of the depression 6 from the wall surface of the shoulder block 4 is fixed in a depth direction DD of the shoulder lateral groove 5 as shown in FIG. 4, and is fixed in a tire width direction WD as shown by a broken line in FIG. 5.

It is preferable that the depth D of the depression 6 is between 0.5 and 2 mm. If the depth D is less than 0.5 mm, an effect of lowering the ground contact pressure is small, and if it goes beyond 2 mm, it becomes hard to form the depression 6. Further, it is preferable that a bottom portion of the depression 6 in the depth direction DD of the shoulder lateral groove 5 is formed as a taper shape as shown in FIG. 4, or a curved shape or a circular arc shape protruding in the depth direction DD, in such a manner as to prevent a crack from being generated by a stress concentration.

The depression 6 is formed in an inner side in the tire width direction WD than the ground contact end CE. Further, it is desirable to arrange the depression 6 in such a manner that a position at which the height H of the depression 6 is highest corresponds to a position at which the ground contact pressure tends to be higher in the tire width direction WD. Specifically, it is preferable that the depression 6 is formed in such a manner that an edge portion in the outer side in the tire width direction WD is positioned within a range between 0 and 20% of the ground contact width CW from the ground contact end CE, and it is more preferable that it is formed in such a manner as to be positioned within a range between 0 and 10% of the ground contact width CW.

The pneumatic tire in accordance with the present invention is the same as the normal pneumatic tire except the matter that the depression 6 as mentioned above is formed on the wall surface of the shoulder block 4 facing to the shoulder lateral groove 5, and it is possible to employ all of the material, the shape, the structure, the manufacturing method and the like of the conventionally known pneumatic tire for the present invention.

Other Embodiment

Figure 6:
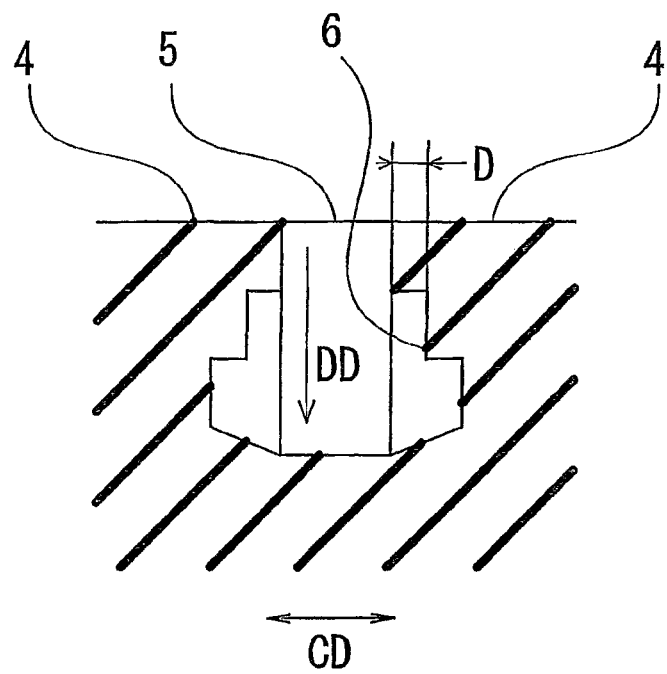
FIG. 6 is a cross sectional view showing the other example of the shoulder lateral groove at the forming position of the depression.

FIG. 6 is a cross sectional view of the shoulder lateral groove 5 at the forming position of the depression 6, in the other embodiment in accordance with the present invention. In the embodiment mentioned above, the depth D of the depression 6 is fixed in the depth direction DD of the shoulder lateral groove 5, however, may be formed in such a manner as to become larger in a stepped manner toward the groove bottom of the shoulder lateral groove 5 as shown in FIG. 6. Accordingly, it is possible to secure the groove volumetric capacity after the abrasion, and the drainage performance is improved.

Figure 7:
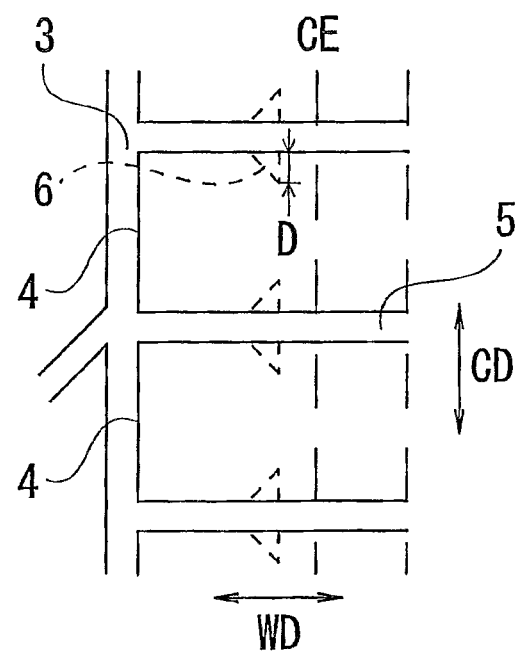
FIG. 7 is a plan view showing the other example of the shoulder block.

Further, FIG. 7 is a plan view of the shoulder block 4 in accordance with the other embodiment of the present invention. In the embodiment mentioned above, the depth D of the depression 6 is fixed in the tire width direction WD, however, it is preferable to increase it toward the outer side in the tire width direction WD as shown by a broken line in FIG. 7.

EXAMPLE

A description will be given below of an example which specifically shows a structure and an effect of the present invention. In this case, each of performance evaluations of the tire was carried out as follows.

(1) Biased Abrasion Resistance

A ratio of an amount of abrasion of a center region with respect to an amount of abrasion of a shoulder region was determined at a time point when 70% of the depth of the shoulder lateral groove wears, and was evaluated by index number by setting a result of a comparative example 1 to 100. The greater the index number is, the less the amount of abrasion of the shoulder region is, thereby indicating an excellence in a biased abrasion resistance.

(2) Drainage Performance

The tire was lock braked on a wet road surface from a traveling speed of 100 km/h, and a braking distance until reaching the traveling speed of 20 km/h was evaluated by index number by setting a result of the comparative example 1 to 100. The greater the index number is, the shorter the braking distance is, thereby indicating an excellence in a drainage performance. The drainage performance was evaluated at a time of a new tire and a time point when 70% of the depth of the shoulder lateral groove wore.

Example 1

The depression 6 shown in FIG. 1 was formed on the wall surface of the shoulder block 4 facing to the shoulder lateral groove 5. The height H1 of the depression 6 was set to 6.4 mm, and the exposure length L3 was set to 12.8 mm. The depth D of the depression 6 was fixed in the depth direction DD of the shoulder lateral groove 5 (refer to FIG. 4), and was fixed in the tire width direction WD (refer to FIG. 5). The tire size was set to 215/60R16.

Example 2

The structure was made in the same manner as the example 1 except the matter that the depth D of the depression 6 was made greater in a stepped manner toward the groove bottom of the shoulder lateral groove 5 (refer to FIG. 6).

Example 3

The structure was made in the same manner as the example 1 except the matter that the depth D of the depression 6 was made greater in a stepped manner toward the groove bottom of the shoulder lateral groove 5 (refer to FIG. 6), and was increased toward the outer side in the tire width direction WD (refer to FIG. 7).

Comparative Example 1

The structure was made in the same manner as the example 1 except the matter that the depression 6 was not provided on the wall surface of the shoulder block 4.

Comparative Example 2

The structure was made in the same manner as the example 1 except the matter that the depression 6 was formed in a state in which it was exposed to the surface of the shoulder block 4 at a time of the new tire.

TABLE 1

|  | Comparative Example 1 | Comparative Example 2 | Example 1 | Example 2 | Example 3 |
| --- | --- | --- | --- | --- | --- |
| Biased abrasion resistance | 100 | 98 | 105 | 103 | 105 |
| Drainage performance (at a time of new tire) | 100 | 100 | 102 | 103 | 103 |
| Drainage performance (at a time of wearing by 70%) | 100 | 105 | 105 | 107 | 107 |

On the basis of Table 1, the shoulder abrasion can be suppressed while securing the drainage performance in any of the examples 1 to 3, in comparison with the comparative examples 1 and 2.

Further, if the depression is exposed to the surface of the shoulder block at a time of the new tire such as the comparative example 2, the biased abrasion resistance and the drainage performance at a time of the new tire are deteriorated in comparison with the example 1. If the depression is exposed to the surface of the shoulder block, the groove width of the lateral groove becomes wider at a time of the new tire, a rigidity step between the lateral grooves becomes larger, and a stepped abrasion becomes larger. Further, if the lateral groove becomes wider at a time of the new tire, it is advantageous in the drainage performance, however, since the rigidity step between the lateral grooves becomes large, and a collapsing of the shoulder block becomes larger, the ground contact performance is deteriorated, and a braking performance is deteriorated. Further, if the depression is exposed to the surface of the shoulder block, a contact area of the land portion becomes small at a time of the new tire, and it is not preferable.

DESCRIPTION OF REFERENCE NUMERALS 1 side wall portion
2 tread surface
3 main groove (shoulder main groove)
4 shoulder land portion (shoulder block)
5 shoulder lateral groove
6 depression
CD tire circumferential direction
WD tire width direction
DD depth direction of the shoulder lateral groove
H height of the depression
L exposure length of the depression
D depth of the depression

What is claimed is:

1. A pneumatic tire comprising:
    a plurality of main grooves extending along a tire circumferential direction;
    shoulder lateral grooves extending to an outer side in a tire width direction from a shoulder main groove positioned in an outermost side in the tire width direction among the main grooves;
    the main grooves and the shoulder lateral grooves being arranged on a tread surface,
    wherein a depression is formed on a wall surface of a land portion facing to the shoulder lateral groove, in a state in which it is not exposed to a surface of the land portion,
    wherein the depression is formed in such a manner that a height of the depression in a depth direction of the shoulder lateral groove is reduced toward an inner side in the tire width direction, and an exposure length of the depression becomes longer in accordance with a progress of an abrasion of the land portion, and
    wherein the height of the depression is reduced toward the inner side in the tire width direction as viewed over its entire width.

2. The pneumatic tire as claimed in claim 1, wherein the height of the depression is reduced in a stepped manner toward the inner side in the tire width direction.

3. The pneumatic tire as claimed in claim 1 or 2, wherein a depth of the depression is increased toward the outer side in the tire width direction.

* * * * *